United States Patent
Gantos et al.

[11] Patent Number: 6,055,901
[45] Date of Patent: May 2, 2000

[54] COOKING UTENSIL

[75] Inventors: Jill L. Gantos, Grand Rapids; Charles S. Mack, Dowling; Susan K. Hoff, Belmont, all of Mich.

[73] Assignee: Amway Corporation, Ada, Mich.

[21] Appl. No.: 09/156,018

[22] Filed: Sep. 17, 1998

[51] Int. Cl.[7] .............................. A47J 27/00; A47J 27/04; A47J 37/00; A47J 37/06; F24D 1/00

[52] U.S. Cl. ............................ 99/412; 99/403; 99/413; 99/450; 126/369; 126/377

[58] Field of Search ..................... 99/339, 340, 403–418, 99/449, 450; 126/373, 376, 369, 377, 350, 20; 210/469, 475, 477; 220/912, 428; 426/510, 511, 523; 219/401, 521

[56] References Cited

U.S. PATENT DOCUMENTS

| | | | |
|---|---|---|---|
| Re. 16,011 | 3/1925 | Simon | 99/412 |
| 100,863 | 3/1870 | Corbett . | |
| 261,142 | 7/1882 | Dorsch et al. . | |
| 419,497 | 1/1890 | Caradine . | |
| 472,002 | 3/1892 | Westcott . | |
| 523,643 | 7/1894 | Pack . | |
| 769,496 | 9/1904 | Seipelt . | |
| 875,972 | 1/1908 | Wessel . | |
| 899,244 | 9/1908 | Chase | 99/412 |
| 1,214,992 | 2/1917 | Boleratz | 99/412 |
| 1,276,749 | 8/1918 | George . | |
| 1,488,150 | 3/1924 | Garibaldi et al. . | |
| 1,715,721 | 6/1929 | Simon . | |
| 2,081,751 | 5/1937 | Lendrum et al. | 99/412 |
| 2,097,478 | 11/1937 | Struble . | |
| 2,188,563 | 1/1940 | Anzalone . | |
| 3,808,963 | 5/1974 | Ludena | 99/417 |
| 4,164,174 | 8/1979 | Wallsten | 99/415 |
| 4,198,561 | 4/1980 | Fujioka . | |
| 4,401,017 | 8/1983 | Feld | 99/413 |
| 4,462,308 | 7/1984 | Wang | 126/369 X |
| 4,574,776 | 3/1986 | Hidle . | |
| 4,604,989 | 8/1986 | Kita | 126/377 X |
| 4,626,352 | 12/1986 | Massey et al. . | |
| 4,646,628 | 3/1987 | Lederman . | |
| 4,688,549 | 8/1987 | Blankemeyer et al. . | |
| 4,714,012 | 12/1987 | Hernandez . | |
| 4,739,698 | 4/1988 | Allaire | 99/417 |
| 4,784,112 | 11/1988 | Hayashi . | |
| 5,092,229 | 3/1992 | Chen . | |
| 5,287,798 | 2/1994 | Tkaeda | 99/413 |
| 5,584,235 | 12/1996 | DuBois et al. | 126/369 X |
| 5,816,139 | 10/1998 | Scorta Paci | 99/410 X |

FOREIGN PATENT DOCUMENTS 677746  3/1930  France .

OTHER PUBLICATIONS

Cuisinart Everyday (9 Quart Stock Pot with Cover): Photos 4–A, 4–B, undated.
Cuisinart Everyday (Past Inset): Photos 5–A, 5–B, 5–C, undated.
Calphalon (8 Qt. Sauce Pot with Pasta Inset & Cover): Photos 6–A, 6–B, undated.
Market Place (Kitchen Basics): Photos 1–A, 1–B, undated.
Williams Sonoma (Multi Pot): Photos 2–A, 2–B, undated.
Calphaton (Pots & Pans): Photos 3–A, 3–B, undated.

*Primary Examiner*—Timothy Simone
*Attorney, Agent, or Firm*—Warner Norcross & Judd LLP

[57] ABSTRACT

A cooking set including a perforated inset and a support ring. The support ring is adapted to fit within and rest upon the rim of a conventional cooking pot or dutch oven to support the inset at various heights. The inset is adapted to fit within the support ring so that it can be lowered into and raised out of the pot. The support ring defines a set of notches and the inset includes a set of corresponding protrusions. When the notches and protrusions are aligned, the inset can be lowered into and raised out of the pot. When the protrusions are not aligned with the notches, they can engage and rest upon the support ring to support the inset in a raised position. In the most preferred embodiment, the inset includes multiple sets of protrusions, each set positioned at a different height along the wall of the inset. Each set of protrusions permits the inset to be supported at a different height.

31 Claims, 6 Drawing Sheets

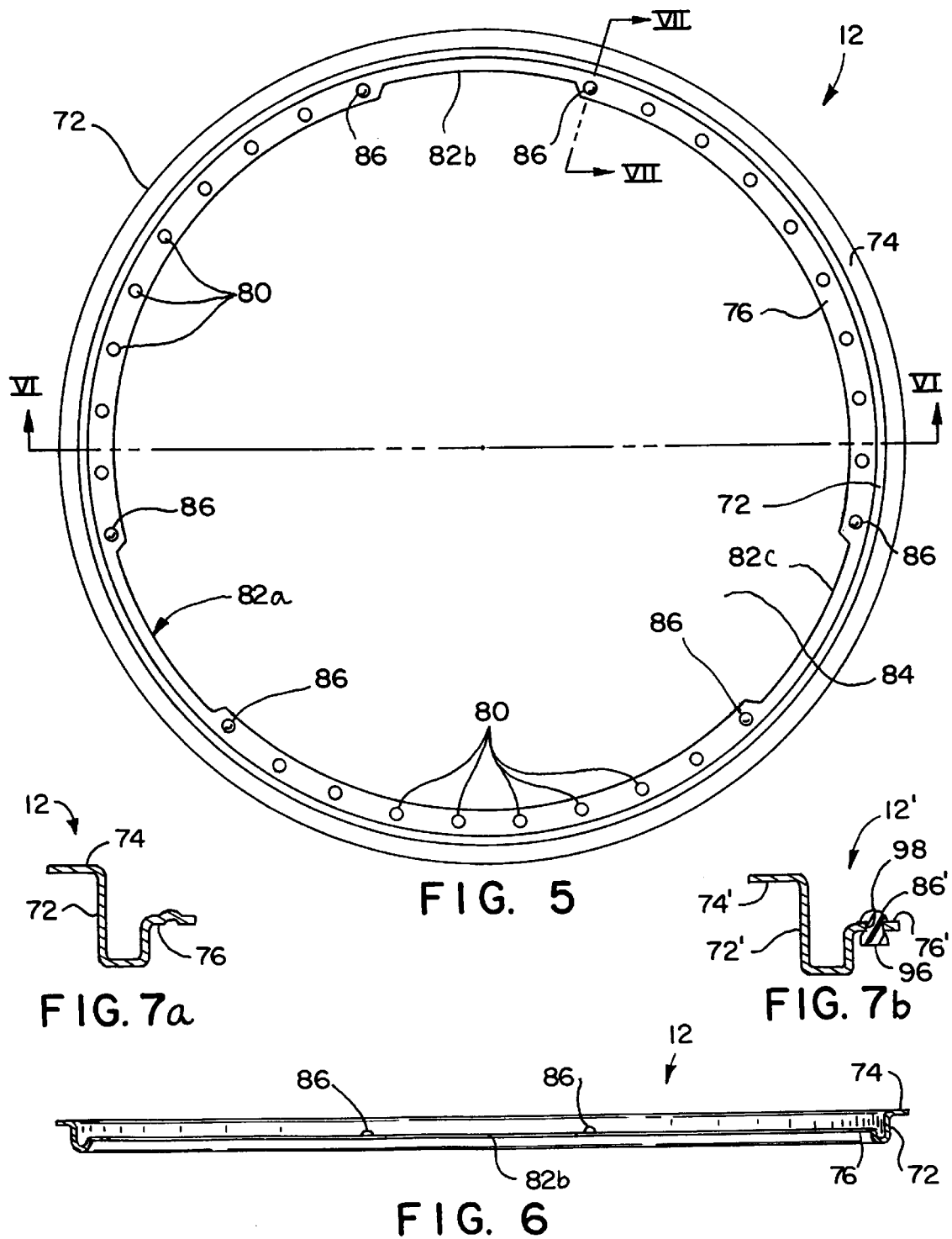

COOKING UTENSIL

BACKGROUND OF THE INVENTION

The present invention relates to cooking utensils, and more particularly to a cooking inset combination adapted to both cook and drain food.

Cooking utensils specially adapted to cook pasta, potatoes and the like are well-known. These utensils typically permit the pasta or other food to be submerged in a cooking medium, such as hot water or hot cooking oil. A common cooking utensil of this type includes an outer vessel that can be partially filled with water, cooking oil or other suitable cooking media, and an inner vessel that is adapted to fit within the outer vessel and to receive the food to be cooked. The inner vessel is perforated to allow the cooking medium contained in the outer vessel to surround and cook the food.

The most desirable of these cooking utensils typically permit the food to be cooked while submerged in the cooking medium and then drained before removal from the pan. An example of this type of cooking utensil is disclosed in U.S. Pat. No. 1,276,749 issued Aug. 27, 1918 to George. George discloses a cooking utensil including an outer vessel and a perforated inner vessel adapted to fit within the outer vessel. The outer vessel includes a pair of inwardly extending ribs positioned toward the top of the vessel. The inner vessel includes a pair of outwardly extending ribs positioned toward the bottom of the vessel. In use, the outer vessel is partially filled with a cooking medium, such as water, and the outer vessel is placed on a stove top or other cook surface to heat the cooking medium. The desired food, for example, pasta, is placed in the inner vessel. Once the water reaches the desired temperature, the inner vessel is lowered into the outer vessel to submerge the food. The inner and outer vessels must be oriented such the ribs of the outer vessel and the ribs of the inner vessel are not in alignment in order to permit the inner vessel to be lowered into the outer vessel. The top rim of the inner vessel rests on the top rim of the outer vessel when the inner vessel is fully lowered. If desired, a lid can be placed on the outer vessel to cover the cooking food. Once the food is fully cooked, the inner vessel is lifted until the ribs of the inner vessel pass the ribs of the outer vessel. The inner vessel is then rotated until the ribs of the inner vessel are aligned with the ribs of the outer vessel. The inner vessel is then lowered until its ribs engage and rest upon the those of the outer vessel. The ribs support the inner vessel in the raised position while the food is drained. George requires an outer vessel that is specially adapted to support the inner vessel in the raised position. As a result, the inner and outer vessels must be purchased for use in combination. Also, the ribs of the outer vessel may prove a hindrance when trying to use the outer vessel as a standard cooking pot. The ribs may also make it more difficult to clean the outer vessel as food may become caught around the edges of the ribs.

Another similar cooking utensil is disclosed in U.S. Pat. No. 2,097,478 to Struble. Struble also includes an outer vessel that supports an inner vessel in lowered and raised positions. More specifically, the outer vessel includes a circumferential flange that is permanently fitted within a circumferential trough in the wall of the outer vessel. Like George, the outer vessel is specially adapted to support the inner vessel, thereby requiring the vessels to be purchased as a combination. Further, the support flange may prove a hindrance when trying to use the outer vessel as a standard cooking pot and when trying to clean the utensil.

SUMMARY OF THE INVENTION

The aforementioned problems are overcome by the present invention wherein a perforated cooking inset and a support ring are provided that can be used in combination with a standard cooking pot or Dutch oven. The support ring rests upon the rim of the pot to support the inset within the pot at various heights, such as a lower height for cooking food or a greater height for draining food.

In a preferred embodiment, the support ring defines a circular opening and a set of notches arranged around the circular opening. The inset includes a set of protrusions positioned near the bottom of the inset. In use, the protrusions are aligned with the notches to permit the inset to be lowered into and raised out of the pot. To move the inset into the lowered position, the inset is lowered until the inset rests upon the bottom of the pot. To move the inset into the raised position, the inset is lifted until the protrusions are located above the support ring. The inset is then rotated until the protrusions are not aligned with the notches, and the inset is lowered until the protrusions engage and rest upon the support ring.

In a more preferred embodiment, the inset includes multiple sets of protrusions located at different heights along the wall of the inset. Each set of protrusions can separately engage and rest upon the support ring to permit the inset to be positioned at various intermediate heights.

In a second aspect, the support ring includes upwardly extending stops located on opposite sides of each notch. The stops reduce the likelihood of the inset inadvertently slipping from a supported position down into the pot. More specifically, the stops prevent the protrusions from being rotated back into alignment with the notches unless the inset is lifted high enough for the protrusions to clear the stops.

In a third aspect, the support ring is perforated to allow water, cooking oil or other cooking medium draining from the inset to more rapidly flow back into the cooking pot or dutch oven. This permits the inset to be lifted out of the pot more quickly without fear of cooking medium spilling over the rim of the pot.

In a fourth aspect, the inset includes an upper portion having an increased diameter that corresponds with the diameter of the pot. As a result, the lid of the pot can be used with the inset.

The present invention provides a simple and effective cooking set that can be used to convert a conventional cooking pot or Dutch oven into a special purpose cooking utensil. The present invention thereby eliminates the need to purchase combination inner and outer vessels. Further, the present invention includes multiple sets of protrusions which permit the inset to be placed at lowered, raised, and intermediate heights. The intermediate heights allow the drained food to be placed closer to the hot cooking medium, thereby keeping the food warmer while it drains. The intermediate heights also make it easier to reach into the pot because they reduce the overall height of the inset and pot. In addition, because the lid of the pot can be used to cover the insert, there is no need to provide the inset with its own lid.

These and other objects, advantages, and features of the invention will be readily understood and appreciated by reference to the detailed description of the preferred embodiment and the drawings.

BRIEF DESCRIPTION OF THE DRAWINGS

FIG. 5 is a top plan view of the support ring;

FIG. 6 is a sectional view of the support ring taken along line VI—VI of FIG. 5;

FIG. 7a is a sectional view of the support ring taken along line VII—VII of FIG. 5;

FIG. 7b is a sectional view of an alternative support ring similar to FIG. 7a;

DETAILED DESCRIPTION OF THE PREFERRED EMBODIMENT

Figure 1:
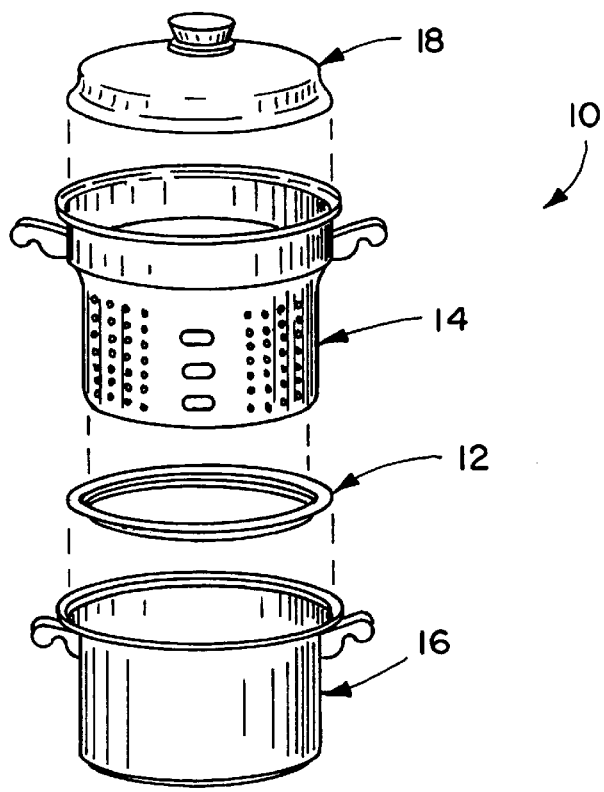
FIG. 1 is an exploded perspective view of the present invention.

A cooking combination according to a preferred embodiment of the present invention is illustrated in FIG. 1, and generally designated 10. The cooking combination 10 includes a support ring 12 and a cooking inset 14. The inset 14 is adapted to receive food items and to fit within a conventional cooking vessel 16. The inset 14 is perforated so that cooking fluid such as hot water or oil contained within the cooking vessel 16 will flow around and cook food contained in the inset 14. The inset 14 includes an upper portion having an increased diameter that corresponds with the diameter of the cooking vessel 16 so that the conventional lid 18 of the cooking vessel 16 can be used as a cover for the inset 14. The support ring 12 is adapted to fit within and rest upon the rim of the cooking vessel 16 to support the inset 14 in one of a variety of raised positions. This permits the cooking fluid to drain from the inset back into the cooking vessel 16 once the food items are cooked. For purposes of disclosure, a 6-quart embodiment of the present invention is described in connection with a conventional 6-quart cooking vessel. It will be readily apparent to one skilled in the art that the present invention is well-suited and easily adapted for use with cooking vessels of other types, sizes, and shapes. For example, an 8-quart embodiment of the present invention may be provided for use with a conventional 8-quart cooking vessel.

Figure 3:
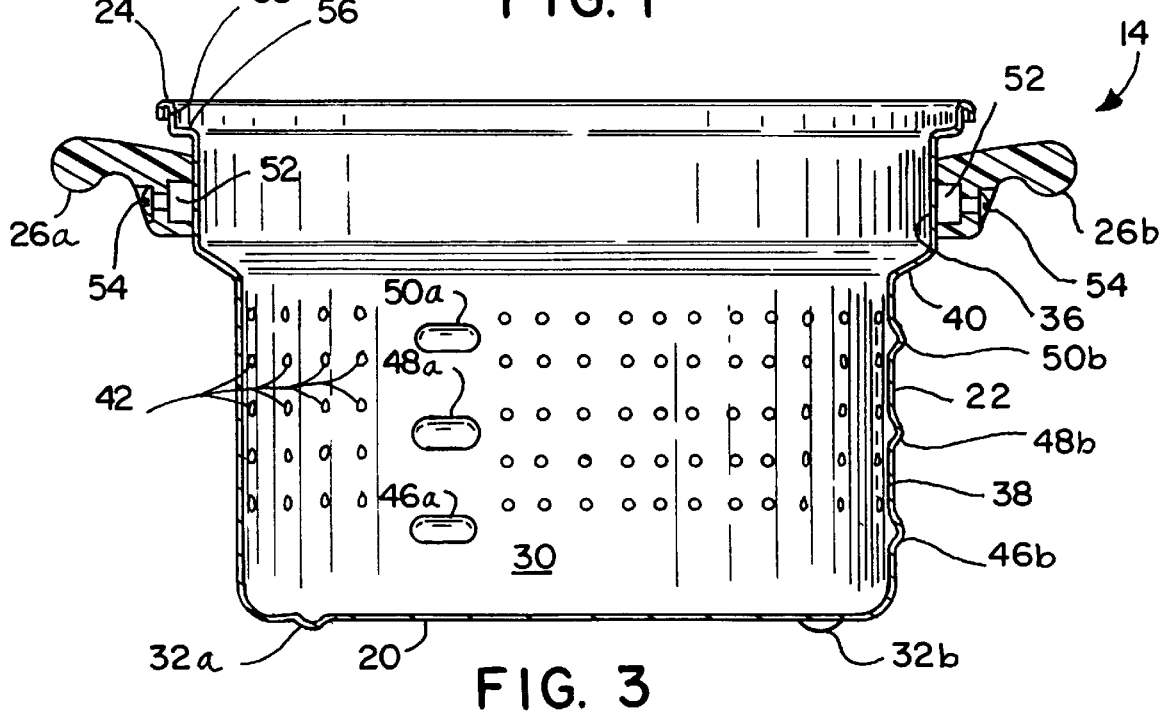
FIG. 3 is a sectional side elevational view of the inset taken along line III—III of FIG. 2.
Figure 2:
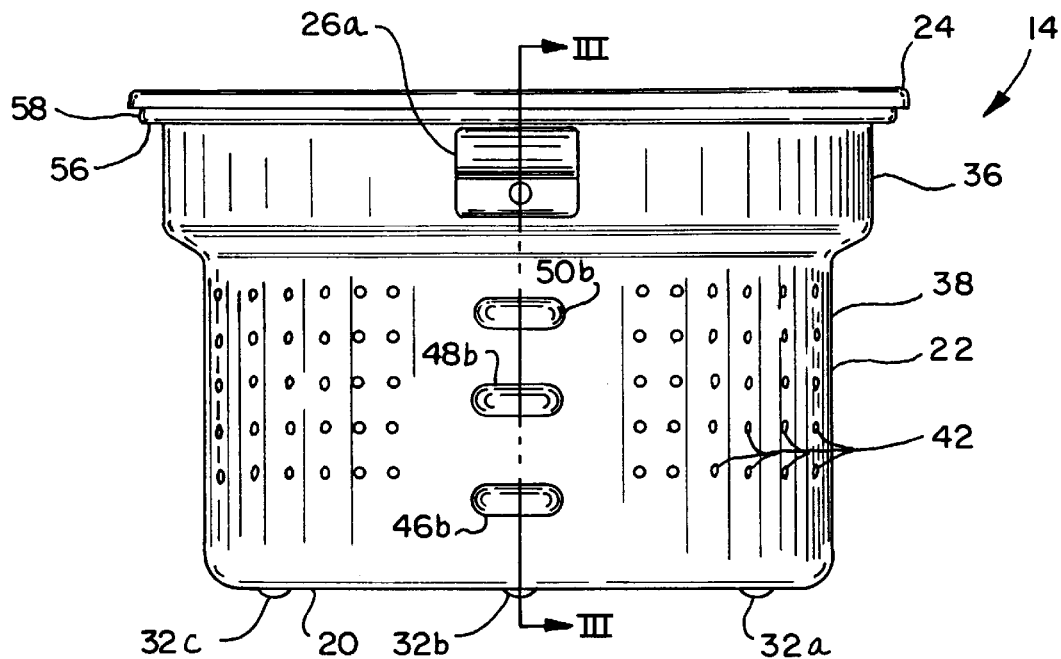
FIG. 2 is a side elevational view of the inset.
Figure 4:
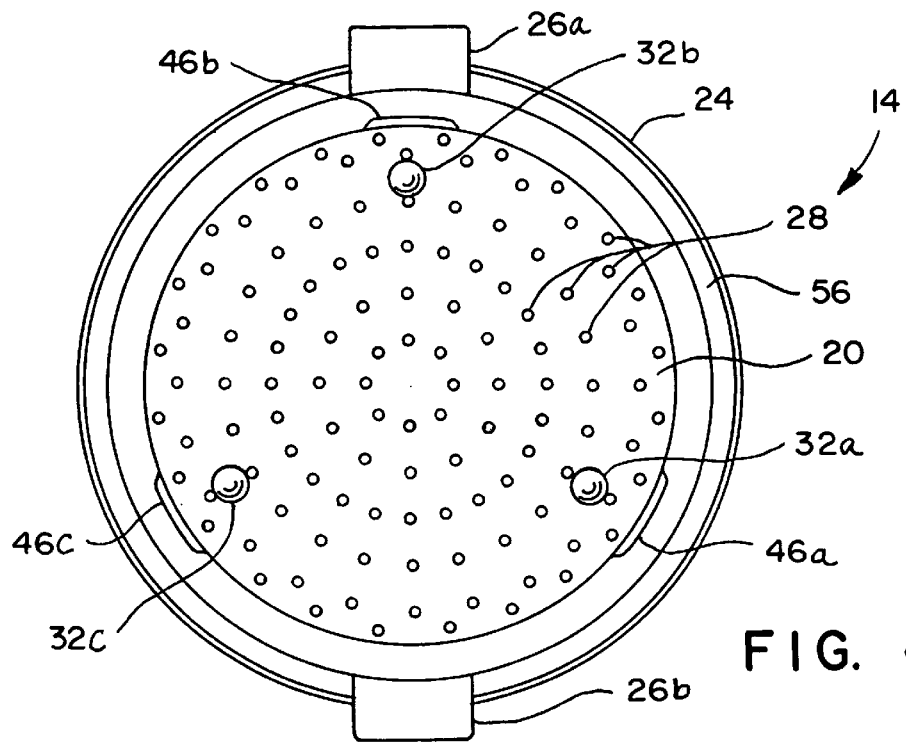
FIG. 4 is bottom plan view of the inset.

Referring now to FIGS. 2–4, the inset 14 include a bottom 20, a circumferential side wall 22 extending upwardly from the periphery of the bottom, a rim 24 extending outwardly around the top edge of the side wall 22, and a pair of handles 26a–b attached to the side wall 22. The bottom 20 and side wall 22 cooperatively define a space 30 for containing the food item(s) to be cooked. As best shown in FIG. 4, the bottom 20 is generally circular and defines a plurality of generally circular perforations 28 which permit cooking fluid to flow into and drain from the inset 14. The perforations 28 are arranged in spaced-apart concentric rings. The specific shape and arrangement of perforations may vary from application to application. The bottom 20 also includes three radially symmetric feet 32a–c that support the inset 14 when the inset 14 is in the lowered position. The support feet 32a–c provide a gap 34 between the bottom of the cooking vessel 16 and the bottom 20 of the inset 14. Because the bottom of the cooking vessel 16 is often in direct contact with the heat source, it can reach extreme temperatures which may cause uneven cooking and other similar problems. The feet 32a–c reduce the amount of the inset 14 that is in direct contact with the bottom of the cooking vessel 16 and also allows cooking fluid to flow therebetween. This reduces the likelihood of any food contained within the inset 14 reaching undesirable temperature extremes. The feet 32a–c are preferably stamped into the bottom 20 during manufacture.

As perhaps best shown in FIG. 3, the side wall 22 includes an upper portion 36, a lower portion 38, and a transition portion 40. The diameter of the lower portion 38 is selected to fit within the support ring 12 and the cooking vessel 16, while the diameter of the upper portion 36 is selected to substantially correspond with that of the cooking vessel 16. The transition portion 40 interconnects the upper portion 36 and the lower portion 38, and its diameter varies accordingly. The lower portion 38 defines a plurality of generally circular perforations 42 which allow cooking fluid to flow into and drain from the inset 14. The perforations 42 are arranged in parallel rows that extend around the circumference of the side wall 22. Obviously, the shape and arrangement of the perforations may vary from application to application. The inset 14 also includes three sets of support protrusions 46, 48 and 50 that are formed in the side wall 22. Each set of support protrusions 46, 48 and 50 includes three radially symmetric protrusions, 46a–c, 48a–c, and 50a–c respectively, that extend outwardly from the side wall 22. The protrusions are radiused and elongated in the circumferential direction. The lower set of protrusions is located toward the bottom of the side wall 22, the middle set of protrusions 48 is located toward the center of the side wall 22, and the upper set of protrusions 50 is located toward the top of the side wall 22. The protrusions of each set of protrusions 46, 48, and 50 are preferably in vertical alignment with one another so that once properly oriented, the inset 14 can be moved entirely into and out of the cooking vessel 16. As described in more detail below, the sets of protrusions 46, 48, and 50 are adapted to cooperate with the support ring 12 to support the inset 14 within the cooking vessel 16 in one of three different raised positions.

The upper and transition portions 36 and 40 of the side wall 22 are unperforated. This helps to prevent heat from escaping from the inset 14, particularly when the inset 14 is in the lowered position. Conventional handles 26a–b are attached to the upper portion 36 in a conventional manner, preferably by a post 52 and screw 54 arrangement (See FIG. 3). The post 52 is preferably attached to the side wall 22 by welding or other conventional methods. Alternatively, the handles 26a–b can be weld attached directly to the upper portion 36. The handles are positioned high enough on the upper portion 36 so that they do not engage the cooking vessel 16 when the inset 14 is in the lowered position.

As noted above, a rim 24 extends from the top edge of the upper portion 36 of the side wall 22. The rim 24 is generally conventional in shape and is adapted to receive the lid 18 of the cooking vessel 16. The rim 24 includes a bottom wall 56 and a circumferential wall 58 extending upwardly from the periphery of the bottom wall 56. The bottom wall 56 supports the lid 18 while the circumferential wall 58 holds it in place atop the inset 14. The diameter of the circumferential wall 56 is substantially equal to the diameter of the circumferential wall 68 of the rim 70 of the cooking vessel 16.

Referring now to FIGS. 5–7, the support ring 12 includes a center portion 72, an outer flange 74 extending outwardly from the center portion 72, and an inner flange 76 extending inwardly from the center portion 72. The center portion 72 is ring-shaped and has a generally J-shaped cross section with the longer leg of the J being on the outward side of the center portion 72. The outer flange 74 is generally planar and extends substantially horizontally outwardly from the center portion 72. The outer flange 74 is adapted to rest directly upon the bottom wall 78 of the rim 70 of the cooking vessel 16. The inner flange 76 is also generally planar and extends substantially horizontally inwardly from the center portion 72 to define a central opening 84. The diameter of the central opening 84 is selected to closely correspond with the outer diameter of the lower portion 38 of the side wall 22 of the inset 14. The inner flange 76 defines a plurality of perforations 80 which allow cooking fluid draining from the inset 14 to flow back into the cooking vessel 16. The perforations 80 are generally circular and are arranged in radially symmetric locations around the entire inner flange 76. The inner flange 76 also defines a plurality of radially symmetric notches 82a–c. The notches 82a–c open into the central opening 84 and are elongated in the circumferential direction to correspond with the shape of the support protrusions 46, 48, and 50 of the inset 14. The inner flange 76 further includes a stop 86 located on opposite sides of each notch 82a–c. The stops 86 extend upwardly to reduce the likelihood of the inset 14 being accidentally or inadvertently rotated out of a support position into a position in which the support protrusions are aligned with the notches 82a–c. The stops 86 may be stamped into the support ring 12 during manufacture. Alternatively, as shown in FIG. 7b, the stops 86' may be plugs 96 that are press-fitted into corresponding perforations 98 in the support ring 12'. The plugs 96 are preferably manufactured from a high temperature thermoplastic, silicone or other conventional materials.

A logo or other visual indicia (not shown) can be attached or applied to the side wall 22 of the inset 14 and to the outer flange 74 of the support ring 12 to aid in aligning the support protrusions 46, 48, and 50 with the notches 82a–c. More specifically, the indicia can be arranged so that when they are aligned, the support protrusions 46, 48, and 50 are aligned with the notches 82a–c. This provides a simple and effective mechanism for allowing the inset 14 to be easily moved between the various positions.

The inset 14 and support ring 12 are manufactured using conventional techniques and apparatus. Both components are preferably stamped from the appropriate sheet material in a conventional stamp forming process. The inset 14 and support ring 12 are preferably stamped from conventional materials. The handle posts 52 are attached to the inset 14 after the stamping process is complete. The posts 52 are preferably attached by welding or other conventional methods. The handles 26a–b are secured to the posts by screws 54.

Following the stamping process, a finish may be applied to the inset 14 and support ring 16 using conventional techniques and apparatus. The finish can be applied either before or after the handle posts 52 are attached.

Figure 8:
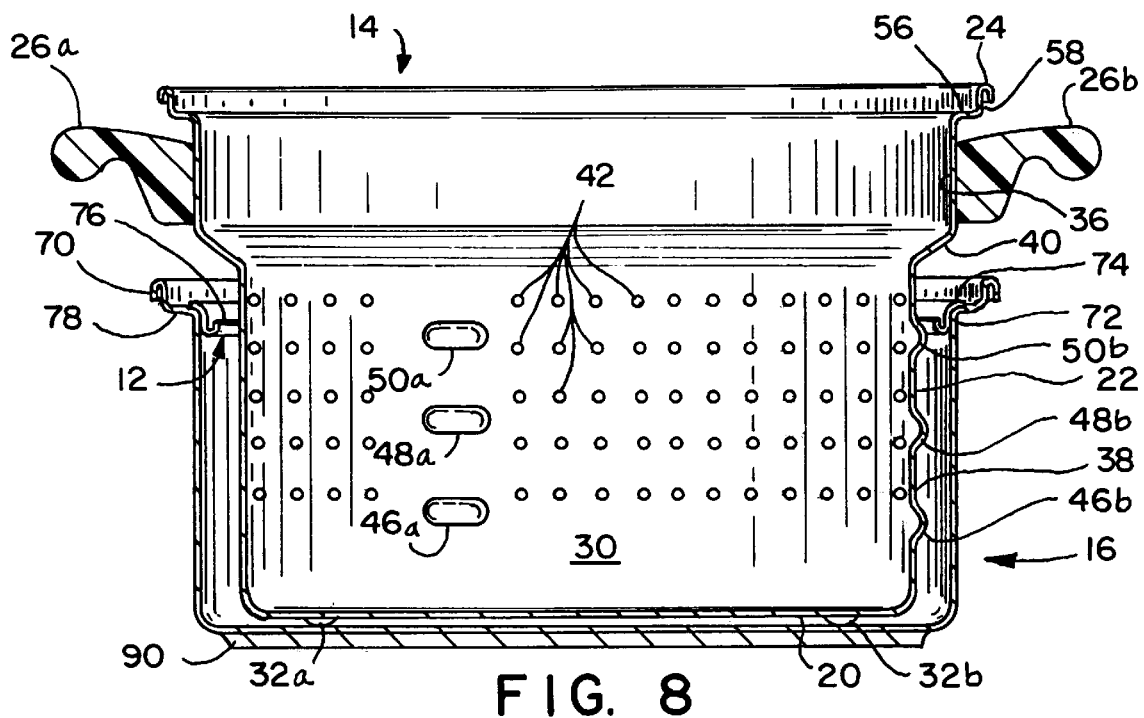
FIG. 8 is a partially sectional view of a 6-quart embodiment of the present invention inserted within a conventional 6-quart cooking vessel in the fully lowered position.
Figure 11:
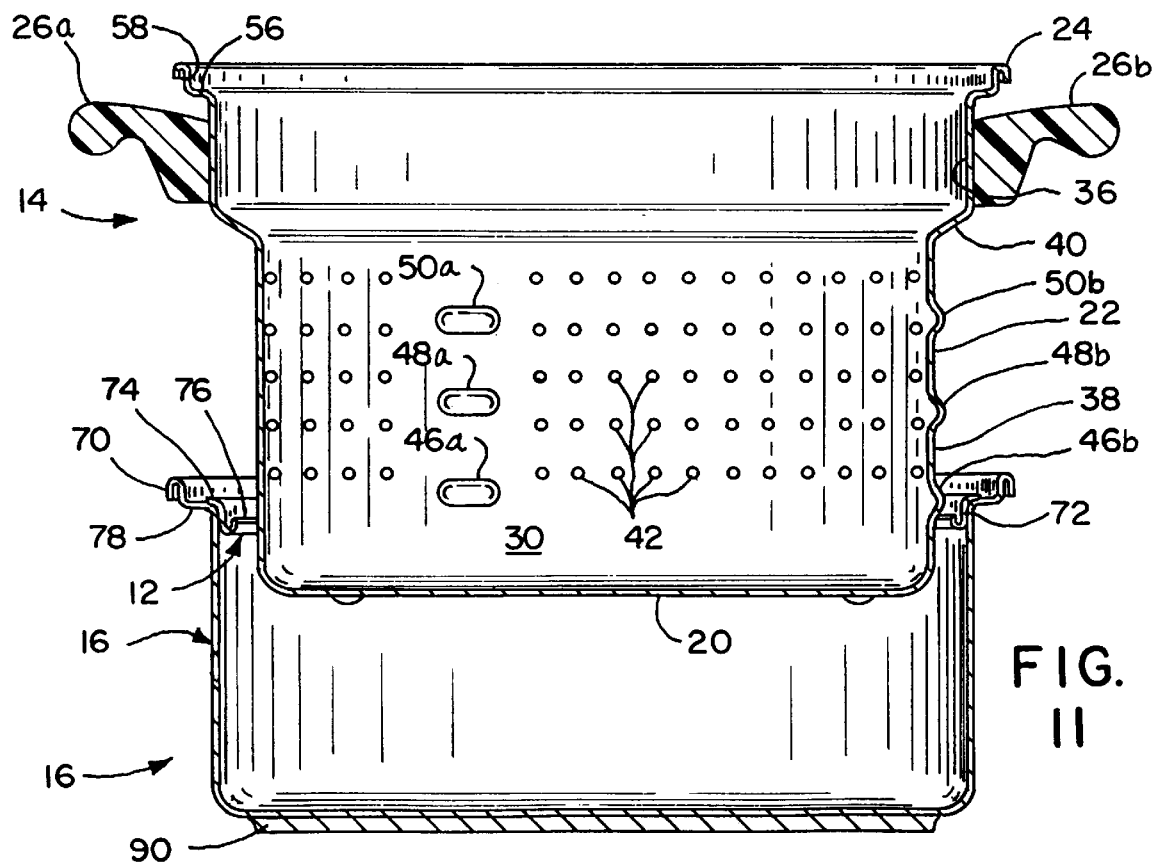
FIG. 11 is a partially sectional view of a 6-quart embodiment of the present invention inserted within a conventional 6-quart cooking vessel in the fully raised position.
Figure 10:
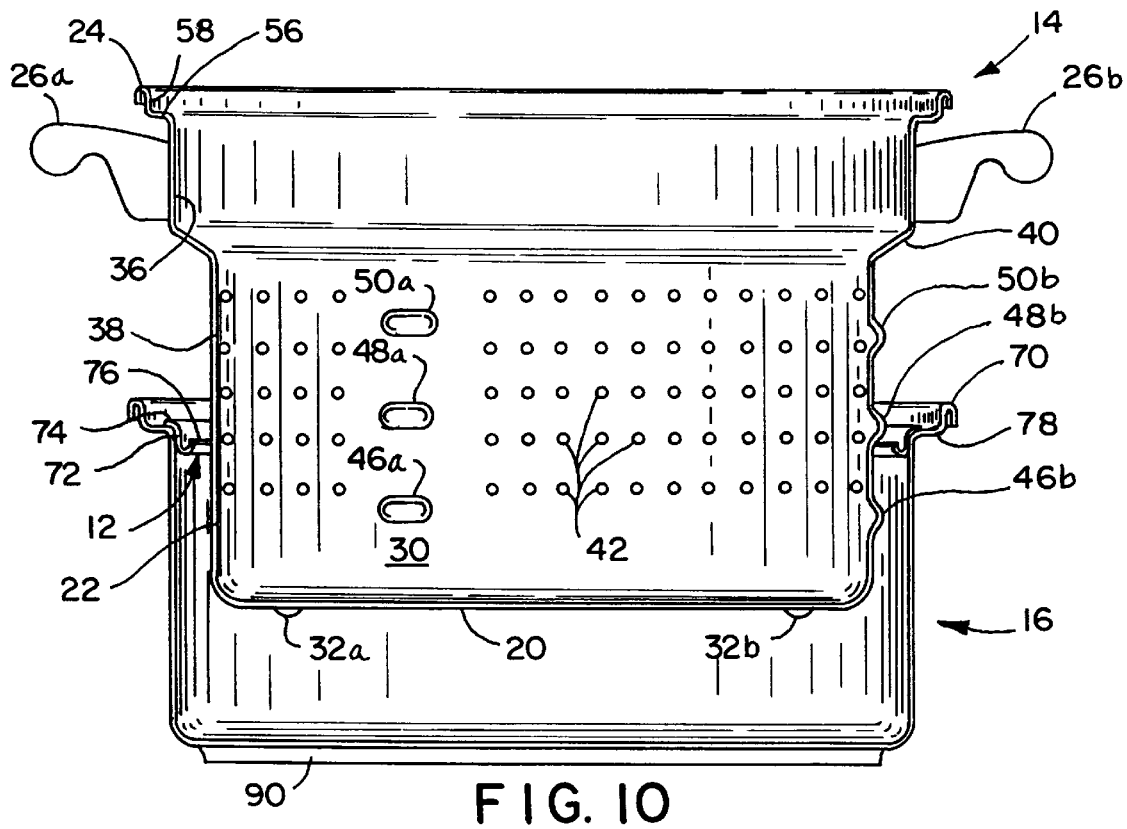
FIG. 10 is a partially sectional view of a 6-quart embodiment of the present invention inserted within a conventional 6-quart cooking vessel in the second intermediate position.
Figure 9:
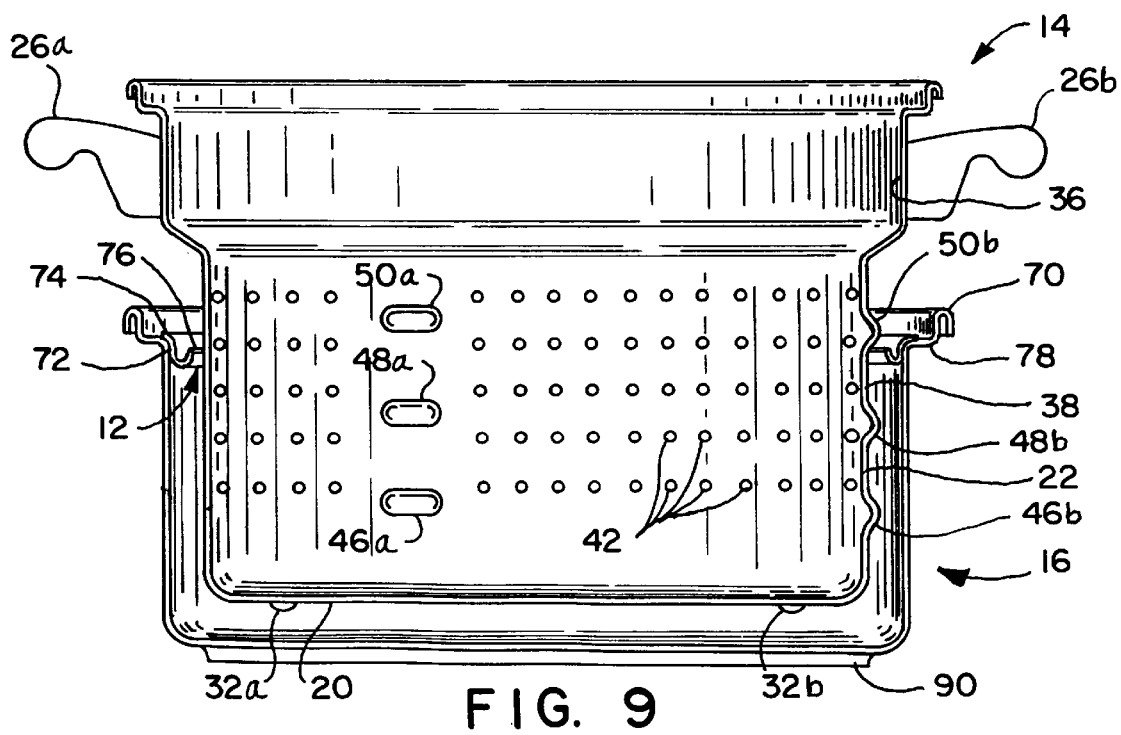
FIG. 9 is a partially sectional view of a 6-quart embodiment of the present invention inserted within a conventional 6-quart cooking vessel in the first intermediate position.

In use, the support ring 12 is fitted into the opening of conventional pot 16 with outer flange 74 resting upon the bottom wall 78 of the pot rim 70. Once the support ring 12 is in place, the inset 14 can be lowered into the pot 16 in the desired position. The inset 14 is lowered into the desired position by positioning the inset 14 above the support ring 12 and aligning the protrusions 46, 48, and 50 with the notches 82a–c. As noted above, the support ring 12 and inset 14 can include visual indicia (not shown) which aid in alignment of the inset 14 and support ring 12. Once aligned, the inset 14 is lowered into the pot 16 through the central opening 84 in the support ring 12. To position the inset 14 in the full lowered position, the inset 14 is lowered into the pot 16 until the feet 32a–c engage the bottom wall 90 of the pot 16 (See FIG. 8). To insert the inset 14 in a raised position, the inset 14 is lowered until the appropriate set of protrusions 46, 48 or 50 is located just above the inner flange 76 of the support ring 12 (See FIGS. 9–11). The inset 14 is then rotated with respect to the support ring 12 until the protrusions 46, 48 or 50 are no longer aligned with the notches 82a–c (approximately 45 degrees). The inset 14 is then lowered until the protrusions 46, 48 or 50 engage and rest upon the support ring 12. The support ring stops 86 prevent the protrusions 46, 48 and 50 from being rotated back into alignment with the notches 82a–c unless the inset 14 is raised high enough for the appropriate set of protrusions 46, 48 or 50 to clear the stops 86. If the inset 14 is not raised sufficiently, the protrusions 46, 48 or 50 will engage the stops 86 as they rotate toward the notches 82a–c thereby causing the support ring 12 to rotate with the inset 14.

Once the food is sufficiently cooked, the inset 14 can be moved into a raised position to allow the cooking medium to drain from the food. It is often desirable to raise the inset 14 just high enough so that the food is above the level of the cooking medium in the pot 16. This will allow the food to drain while also helping to keep it warm as heat continues to radiate from the cooking medium. The intermediate positions shown in FIGS. 9 and 10 (i.e. the positions between the full lowered position and the full raised position) also make it easier to reach food contained within the inset 14 because they reduce the overall height of the inset 14 and pot 16. Because the rim 24 of the inset 14 is substantially equal in diameter to the rim 70 of the pot 16, the conventional lid 18 provided with the pot 16 can be used to cover the inset 14 during cooking, draining or when otherwise desired.

Figure 12:
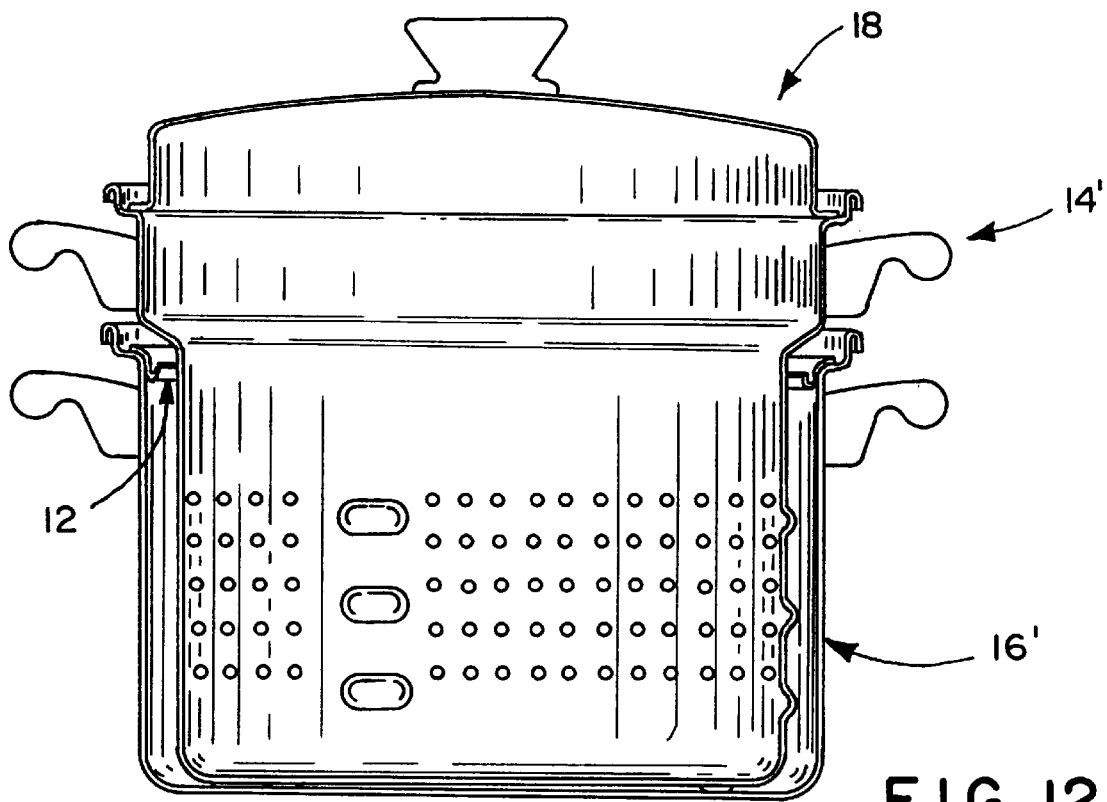
FIG. 12 is a partially sectional view of an 8-quart embodiment of the present invention inserted within a conventional 8-quart cooking vessel.
Figure 13:
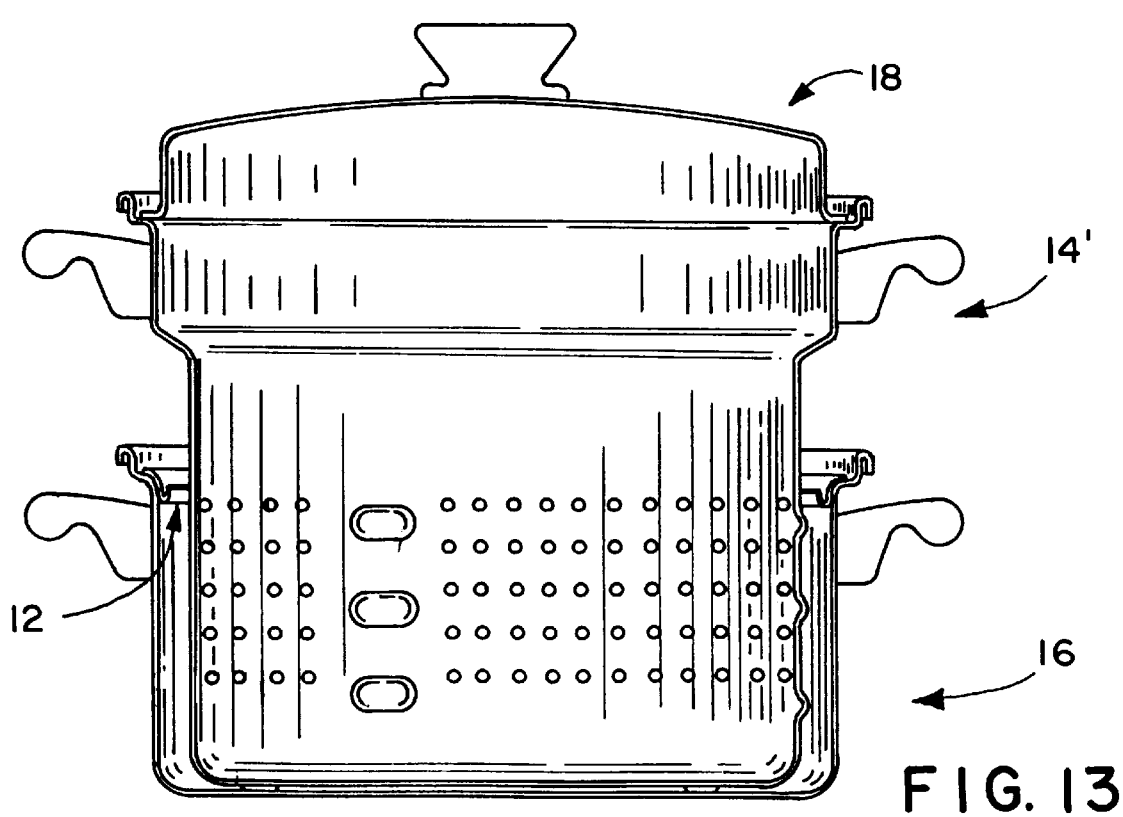
FIG. 13 is a partially sectional view of an 8-quart embodiment of the present invention inserted within a conventional 6-quart cooking vessel.

An alternative embodiment of the present invention is illustrated in FIGS. 12 and 13. In this embodiment, the inset 14' and support ring 12' are generally identical to the above described embodiment except that the inset 14' has an 8-quart capacity. The increased capacity of the 8-quart inset 14' results from an increase in the height of the side wall 22' of the inset 14'. Obviously, the capacity of the inset 14' can alternatively be increased by increasing the diameter of the side wall 22'. As shown, the 8-quart inset 14' can be used with both 8-quart pots 16' (See FIG. 12) and 6-quart pots 16" (See FIG. 13).

The above description is that of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege are claimed are defined as follows:

1. A cooking set adapted for use with a conventional cooking vessel having a rim comprising:
    a support ring adapted to rest upon the rim of the cooking vessel, said support ring defining an opening;
    an inset adapted to fit closely within said opening in said support ring, said inset having a top and a bottom and defining a plurality of perforations; and a support means for selectively supporting said inset on said support ring in a raised position.

2. The cooking set of claim 1 wherein said support means includes:

said support ring defining a plurality of notches, said notches defined about and communicating with said opening; and said inset including a lower plurality of protrusions located toward said bottom of said inset, said protrusions corresponding in number and arrangement with said notches, said protrusions extending outwardly from said inset to rest upon said support ring when not in alignment with said notches to support said inset in said lowered position.

3. The cooking set of claim 2 wherein said inset includes an upper portion and a lower portion, said upper portion having a greater diameter than said lower portion, said diameter of said upper portion selected to substantially correspond with the diameter of the cooking vessel.

4. The cooking set of claim 3 wherein said support ring defines a plurality of perforations.

5. The cooking set of claim 4 wherein said support ring defines stops extending upwardly on opposite sides of each of said notches.

6. The cooking set of claim 5 wherein said support means includes an intermediate plurality of protrusions located above said lower plurality of protrusions, said intermediate protrusions corresponding in number and arrangement with said notches, said intermediate protrusions extending outwardly from said inset to rest upon said support ring when not in alignment with said notches to support said inset in an intermediate position between said raised position and said lowered position.

7. The cooking set of claim 6 wherein said stops are integral raised portions of said support ring.

8. The cooking set of claim 6 wherein said stops include plugs press-fitted into corresponding perforations in said support ring.

9. A cooking utensil for use with a cooking pot having a rim and defining a space for containing a cooking medium comprising:

a support ring fitted within the pot, said support ring including an outer flange resting upon the rim of the pot and an inner flange extending inwardly into the pot, said inner flange defining an opening and a plurality of notches; and a perforated inset extending into the space in the pot through said opening in said support ring, said inset movable between a raised position and a lowered position, said inset adapted to engage and rest upon the bottom of the pot when in said lowered position, said inset including a lower plurality of outwardly extending protrusions, said lower protrusions arranged to selectively rest upon said support ring to support said inset in said raised position, said lower protrusions arranged to selectively align with said notches to permit said inset to be lowered into and raised out of the space in the pot through said opening in said support ring.

10. The cooking utensil of claim 9 wherein said support ring defines a plurality of perforations arranged around said support ring.

11. The cooking utensil of claim 10 wherein said support ring defines stops extending upwardly on opposite sides of each of said notches.

12. The cooking utensil of claim 11 wherein said inset further includes an intermediate plurality of outwardly extending protrusions, said intermediate protrusions arranged to selectively rest upon said support ring to support said inset in an intermediate position between said raised position and said lowered position and to selectively align with said notches to permit said inset to be lowered into and raised out of the space in the pot through said opening is said support ring.

13. The cooking utensil of claim 12 wherein said lower protrusions and said intermediate protrusions correspond in number and arrangement to said notches.

14. The cooking utensil of claim 13 wherein said inset includes a plurality of downwardly extending feet.

15. The cooking utensil of claim 14 wherein said lower protrusions are vertically aligned with said intermediate protrusions.

16. The cooking utensil of claim 15 wherein said lower protrusion and said intermediate protrusions are disposed radially symmetrically about said inset.

17. The cooking utensil of claim 16 wherein said inset defines a circumferential side wall defining a plurality of perforations, said lower protrusions disposed on said side wall beneath said perforations.

18. The cooking utensil of claim 17 wherein said stops are integral raised portions of said support ring.

19. The cooking utensil of claim 17 wherein said stops include plugs press-fitted into corresponding perforations in said support ring.

20. A cooking inset and support ring combination for use in a conventional cooking vessel having an upper rim comprising:

a support ring adapted to fit within the vessel and rest upon the rim of the vessel, said support ring including a ring-shaped central portion, an outer flange extending radially outwardly from said central portion, and an inner flange extending radially inwardly from said central portion, said outer flange adapted to engage and rest upon the rim of the vessel, said inner flange defining a plurality of perforations, a concentric circular opening and a plurality of notches opening into said opening; and an inset adapted to fit through said opening in said support ring and extend into the vessel, said inset being movable between a raised position and a lower position, said inset including a circular bottom, a circumferential sidewall extending upwardly from the periphery of said bottom, and a rim extending outwardly from said sidewall, said sidewall having an upper portion and a lower portion, said upper portion having a greater diameter than said lower portion, said upper portion and said lower portion being interconnected by a transition portion, said inset adapted to engage the bottom of the vessel when in said lowered position, said inset further including a lower plurality of outwardly extending protrusions, said lower protrusions arranged to rest upon said inner flange of said support ring to support said inset in a raised position and to selectively align with said notches to permit said inset to be lowered into and raised out of the space in the pot through said opening is said support ring.

21. The combination of claim 20 wherein said diameter of said upper portion of said inset is substantially equal to the diameter of the pot whereby a single lid will fit both the pot and said inset.

22. The combination of claim 21 wherein said support ring defines a plurality of perforations arranged around said support ring to allow a cooking medium draining from said inset to drain into the vessel.

23. The combination of claim 22 wherein said support ring defines stops extending upwardly on opposite sides of each of said notches to reduce the likelihood of said inset being inadvertently moved between said raised and lowered positions.

24. The combination of claim 23 wherein said inset further includes an intermediate plurality of outwardly extending protrusions, said intermediate protrusions arranged to selectively rest upon said support ring to support said inset in an intermediate position between said raised position and said lowered position and to selectively align with said notches to permit said inset to be lowered into and raised out of the space in the pot through said opening is said support ring.

25. The combination of claim 24 wherein said lower protrusions and said intermediate protrusions correspond in number and arrangement to said notches.

26. The combination of claim 25 wherein said bottom of said inset includes a plurality of downwardly extending feet adapted to engage the vessel when said inset is in said lowered position.

27. The combination of claim 26 wherein said lower protrusions are vertically aligned with said intermediate protrusions.

28. The combination of claim 27 wherein said lower protrusion and said intermediate protrusions are disposed radially symmetrically about said inset.

29. the combination of claim 28 wherein said inset defines a circumferential side wall defining a plurality of perforations, said lower protrusions disposed on said side wall beneath said perforations.

30. The combination of claim 29 wherein said stops are integral raised portions of said support ring.

31. The combination of claim 29 wherein said stops include plugs press-fitted into corresponding perforations in said support ring.

* * * * *